US010625635B1

(12) United States Patent
Veine (10) Patent No.: US 10,625,635 B1
(45) Date of Patent: Apr. 21, 2020

(54) VEHICLE SEAT RELEASE MECHANISM (71) Applicant: LEAR CORPORATION, Southfield, MI (US)

(72) Inventor: Eric Veine, Wixom, MI (US)

(73) Assignee: LEAR CORPORATION, Southfield, MI (US)

( * ) Notice: Subject to any disclaimer, the term of this patent is extended or adjusted under 35 U.S.C. 154(b) by 38 days.

(21) Appl. No.: 16/150,698

(22) Filed: Oct. 3, 2018

(51) Int. Cl.
*B60N 2/90* (2018.01)
*B60N 2/20* (2006.01)
*B60N 2/22* (2006.01)
*B60N 2/015* (2006.01)
*B60N 2/30* (2006.01)

(52) U.S. Cl.
CPC ....... *B60N 2/2218* (2013.01); *B60N 2/01583* (2013.01); *B60N 2/3011* (2013.01)

(58) Field of Classification Search
CPC .......... B60N 2/20; B60N 2/22; B60N 2/2356; B60N 2/12; B60N 2/2026; B60N 2/2227; B60N 2/68; B60N 2/10; B60N 2/01583
See application file for complete search history.

(56) References Cited

U.S. PATENT DOCUMENTS

| | | | | |
|---|---|---|---|---|
| 5,531,503 A | * | 7/1996 | Hughes | B60N 2/12 297/341 |
| 6,739,668 B2 | * | 5/2004 | Coman | B60N 2/206 297/378.12 |
| 7,686,398 B2 | * | 3/2010 | Yokoyama | B60N 2/12 297/341 |
| 8,061,776 B2 | * | 11/2011 | Gi | B60N 2/01508 297/341 |
| 8,408,648 B2 | | 4/2013 | Champ | |
| 8,544,956 B2 | | 10/2013 | Park et al. | |
| 8,690,251 B2 | | 4/2014 | Miller et al. | |
| 10,071,656 B2 | * | 9/2018 | Wetzig | B60N 2/23 |
| 10,183,596 B2 | * | 1/2019 | Watanabe | B60N 2/688 |
| 10,293,730 B2 | * | 5/2019 | Fujioka | B60N 2/933 |
| 10,427,576 B2 | * | 10/2019 | Nozue | B60N 2/933 |
| 10,442,323 B2 | * | 10/2019 | Maeda | B60N 2/2362 |
| 2003/0127898 A1 | * | 7/2003 | Niimi | B60N 2/206 297/367 R |
| 2003/0197410 A1 | | 10/2003 | Blair et al. | |
| 2004/0021355 A1 | * | 2/2004 | Ohba | B60N 2/06 297/341 |
| 2010/0225151 A1 | | 9/2010 | Michalak et al. | |

(Continued)

*Primary Examiner* — Shin H Kim
(74) *Attorney, Agent, or Firm* — Brooks Kushman P.C.

(57) ABSTRACT

A vehicle seat for use with a vehicle having a locking mechanism includes a seat bottom mountable on the vehicle so that a position of the seat bottom may be fixed by the locking mechanism, a seat back pivotally attached to the seat bottom and movable between first and second positions, and a release mechanism configured to release the locking mechanism. The release mechanism includes a release lever connectable to the locking mechanism, and a release bracket engageable with the release lever. One of the release lever and the release bracket includes a cam to cause the release lever to release the locking mechanism when the seat back is pivoted from the first position toward the second position. The cam includes a dwell surface that enables the locking mechanism to remain released until the seat back reaches the second position, or a position proximate the second position.

20 Claims, 4 Drawing Sheets

(56) References Cited

U.S. PATENT DOCUMENTS

| | | | |
|---|---|---|---|
| 2010/0283301 A1* | 11/2010 | Shanmugam | B60N 2/12 297/344.1 |
| 2011/0127822 A1* | 6/2011 | Moegling | B60N 2/12 297/378.12 |
| 2012/0223561 A1* | 9/2012 | Hurst, III | B60N 2/22 297/344.1 |
| 2012/0286556 A1* | 11/2012 | Couasnon | B60N 2/20 297/463.1 |
| 2014/0077537 A1* | 3/2014 | Higashi | B60N 2/2356 297/216.13 |
| 2015/0202996 A1* | 7/2015 | Kajale | B60N 2/206 297/363 |
| 2016/0016486 A1* | 1/2016 | Aktas | B60N 2/12 297/378.12 |
| 2016/0339809 A1* | 11/2016 | Wetzig | B60N 2/20 |
| 2017/0001546 A1 | 1/2017 | Keyser et al. | |
| 2017/0253152 A1* | 9/2017 | Maeda | B60N 2/2362 |
| 2018/0050616 A1* | 2/2018 | Nozue | B60N 2/933 |
| 2018/0281635 A1* | 10/2018 | Watanabe | B60N 2/688 |
| 2018/0361882 A1* | 12/2018 | Ikeda | B60N 2/12 |

\* cited by examiner

VEHICLE SEAT RELEASE MECHANISM

TECHNICAL FIELD

The disclosure relates to a vehicle seat having a release mechanism for releasing a locking mechanism.

BACKGROUND

Vehicle seats may be provided with mechanisms for enabling seat movement. Examples of such mechanisms are disclosed in U.S. Pat. Nos. 8,544,956 and 8,690,251.

SUMMARY

A vehicle seat according to the disclosure is provided for use with a vehicle having a locking mechanism. The vehicle seat includes a seat bottom mountable on the vehicle so that a position of the seat bottom may be fixed by the locking mechanism, and a seat back pivotally attached to the seat bottom and movable between first and second positions. The vehicle seat further includes a release mechanism configured to release the locking mechanism when the seat bottom is mounted on the vehicle and the seat back is pivoted toward the seat bottom from the first position toward the second position. The release mechanism includes a release lever that is connectable to the locking mechanism, and a release bracket associated with the seat back and engageable with the release lever. One of the release lever and the release bracket includes a cam configured to cooperate with the other of the release lever and the release bracket to cause the release lever to release the locking mechanism when the seat back is pivoted from the first position toward the second position, so that the locking mechanism is released before the seat back reaches the second position. The cam includes a dwell surface that enables the locking mechanism to remain released until the seat back reaches the second position, or a position proximate the second position.

According to an embodiment of the disclosure, a vehicle seat is provided for use with a vehicle having a seat track assembly including a first track, a second track that is movable with respect to the first track, and a locking mechanism for locking the second track with respect to the first track. The vehicle seat includes a seat bottom mountable on the second track of the seat track assembly, and a seat back pivotally attached to the seat bottom and movable between first and second positions. The vehicle seat further includes a release mechanism configured to release the locking mechanism of the seat track assembly when the seat bottom is mounted on the second track of the seat track assembly and the seat back is pivoted toward the seat bottom from the first position toward the second position. The release mechanism includes a release lever that is connectable to the locking mechanism of the seat track assembly, and a release bracket connected to the seat back and engageable with the release lever. One of the release lever and the release bracket includes a cam configured to cooperate with the other of the release lever and the release bracket to cause the release lever to release the locking mechanism of the seat track assembly when the seat back is pivoted from the first position toward the second position, so that the locking mechanism is released before the seat back reaches the second position. The cam includes a dwell surface that enables the locking mechanism to remain released until the seat back reaches the second position, or a position proximate the second position.

While exemplary embodiments are illustrated and disclosed, such disclosure should not be construed to limit the claims. It is anticipated that various modifications and alternative designs may be made without departing from the scope of the disclosure.

DETAILED DESCRIPTION

As required, detailed embodiments are disclosed herein; however, it is to be understood that the disclosed embodiments are merely exemplary, and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

A vehicle seat according to the present disclosure may be configured to facilitate unlocking of the seat with respect to a vehicle in which the seat is mounted. For example, a vehicle seat according to the disclosure may be configured to unlock or release a locking mechanism of a seat track assembly, on which the seat is mounted, during an easy entry operation in which a vehicle user desires to gain access behind the seat.

Figure 1:
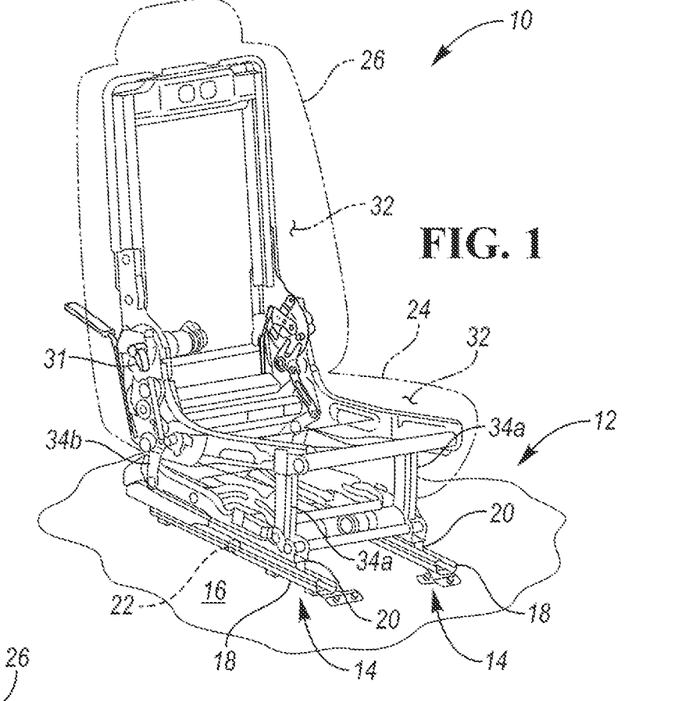
FIG. 1 is a perspective view of a vehicle seat according to the present disclosure mounted on right and left seat track assemblies and including a seat back pivotally connected to a seat bottom.

FIG. 1 shows a vehicle seat 10 according to the present disclosure for use with a vehicle 12 having at least one locking mechanism for locking a position of the vehicle seat 10 with respect to the vehicle 12. For example, the vehicle seat 10 may be mounted on a pair of seat track assemblies 14 (e.g., right and left seat track assemblies) that are attached to a floor 16 of the vehicle 12, and each seat track assembly 14 may include a first track, such as a lower track 18, attached to the floor 16, a second track, such as an upper track 20, connected to the seat 10 and slidably mounted on the lower track 18, and a locking mechanism 22 (shown schematically) that is configured to lock the upper track 20 with respect to the lower track 18. In the illustrated embodiment, each locking mechanism 22 is mounted on a respective upper track 20 and is movable between an unlocked or released position and a locked position engaged with a respective lower track 18 in order to lock the upper track 20 with respect to the lower track 18. When the locking mechanisms 22 are unlocked or released, the upper tracks 20 and the seat 10 are translatable with respect to the lower tracks 18. In another embodiment, the seat 10 may be mounted on a single track assembly having a locking mechanism.

Figure 2:
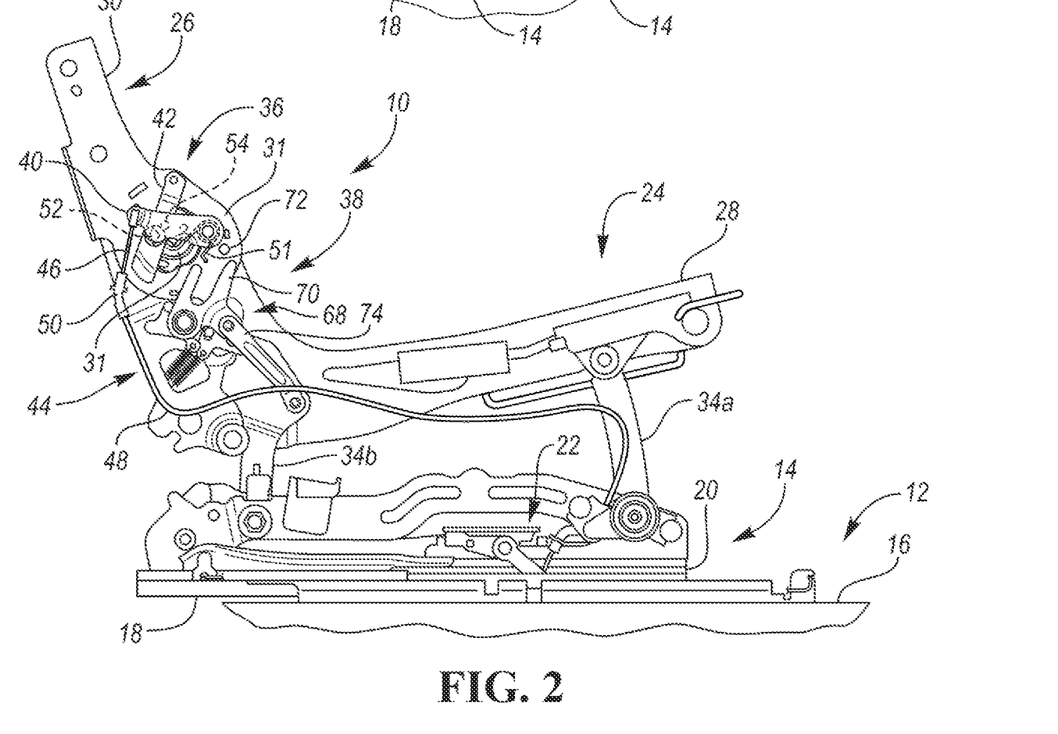
FIG. 2 is a side cross-sectional view of a portion of the seat of FIG. 1 showing an interior view of a left side portion of the seat including a release mechanism and a movement mechanism of the seat, wherein the seat back is shown in a first position, such as an upright use position, and the seat bottom shown in a raised, use position, and wherein the release mechanism includes a rotatable release lever and a release bracket connected to the seat back and engageable with the release lever.
Figure 3:
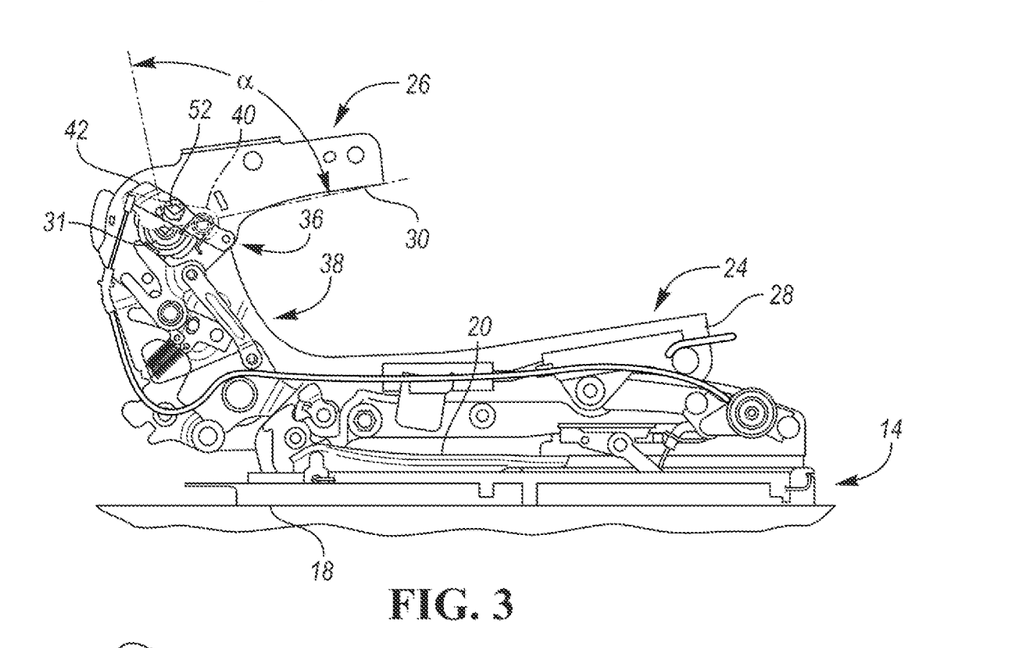
FIG. 3 is a side cross-sectional view similar to FIG. 2 showing the seat back pivoted fully forwardly to a folded position, and the seat bottom lowered to a stowed or kneeled position, wherein an outer perimeter of the release lever is shown in phantom lines.

Referring to FIGS. 1-3, the seat 10 includes a generally horizontal seat bottom 24 and a seat back 26 that is pivotable with respect to the seat bottom 24 through an angle α between a first position, such as a generally upright use or seating position shown in FIG. 2, and a second position, such as a folded position shown in FIG. 3. The seat bottom 24 and seat back 26 may each include a support structure or frame 28 and 30, respectively, and the frames 28, 30 may be pivotally connected together with a pivot mechanism, such as any suitable reclining mechanism 31 (e.g., disc-type recliner, sector gear recliner, etc.). The seat bottom 24 and seat back 26 may also each include any suitable cushioning material (not shown), such as a foam cushion, positioned on the frame 28, 30, and any suitable cover material 32, such as cloth, leather and/or vinyl, positioned over the cushioning material and the frame 28, 30.

In the embodiment shown in FIGS. 1-3, the seat bottom 24 is connected to the seat track assemblies 14 with multiple pivotable legs 34. For example, the seat bottom 24 may be connected to each of the right side and left side seat track assemblies 14 with front and rear pivotable legs 34a and 34b, respectively.

In addition, the seat 10 includes a release mechanism 36, such as an easy entry mechanism, for releasing the locking mechanisms 22 when the seat back 26 is pivoted in a first direction (e.g., clockwise in the embodiment shown in FIG. 2) from the first position toward the second position. The seat 10 may also include a movement mechanism 38 that is configured to lower the seat bottom 24 from a raised, use or seating position (shown in FIG. 2) to a lowered, stowed position or kneeled position (shown in FIG. 3) when the seat back 26 is pivoted from the first position toward the second position.

Figure 4:
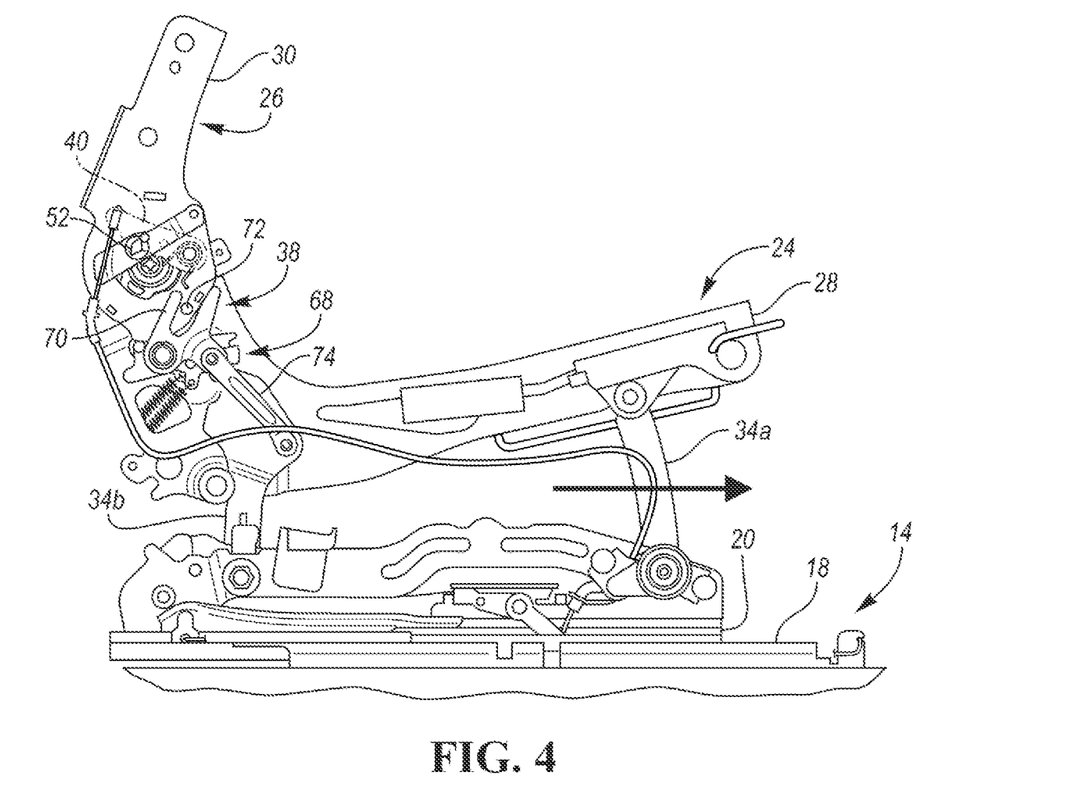
FIG. 4 is a side cross-sectional view similar to FIG. 2 showing the seat back pivoted partially forwardly, and showing an engagement member of the release lever engaged with a release surface of a cam of the release bracket to release locking mechanisms of the seat track assemblies, so that the seat may move forwardly with respect to lower tracks of the seat track assemblies.

Referring to FIGS. 2-4, the release mechanism 36 includes a release lever 40 that is connected to the locking mechanisms 22 of the seat track assemblies 14, and a release bracket 42 connected to the seat back 26 and engageable with the release lever 40. The release bracket 42 is engageable with the release lever 40 as the seat back 26 is pivoted from the first position toward the second position in order to move (e.g., pivot) the release lever 40 from an initial position, shown in FIG. 2, to a release position, shown in FIG. 4, for releasing the locking mechanisms 22 of the seat track assemblies 14.

In the illustrated embodiment, the release lever 40 has an elongated lever body having one end that is pivotally connected to the frame 30 of the seat back 26. An opposite end of the lever body of the release lever 40 is connected to the locking mechanisms 22 in any suitable manner. For example, the release lever 40 may be connected to the locking mechanisms 22 with a cable assembly 44. The cable assembly 44 may include a main cable 46 connected to the release lever 40, and branching cables 48 connected to the main cable 46. Each branching cable 48 may extend from the main cable 48 to a respective locking mechanism 22. The cable assembly 44 may also include a compensator 50 to compensate for tolerance variations in the locking mechanisms 22, the release mechanism 36, or other components of the seat 10, to ensure that the cable assembly 44 will release the locking mechanism 22 when the seat back 26 is folded forwardly from the first position toward the second position. Furthermore, the release lever 40 may be connected to a biasing member, such as a spring 51, for urging the release lever 40

In the illustrated embodiment, the release bracket 42 includes an elongated bracket body that is fixedly secured to the frame 30 of the seat back 26 so that the release bracket 42 is movable with the seat back 26. For example, the release bracket 42 may be riveted or welded to the frame 30 of the seat back 26, or connected to the frame 30 of the seat back 26 with any suitable fasteners. Furthermore, opposite ends of the release bracket 42 may be fixedly secured to the frame 30 on opposite sides of the reclining mechanism 31.

One of the release lever 40 and the release bracket 42 includes a cam 52 that is configured to cooperate with the other of the release lever 40 and the release bracket 42 to cause the release lever 40 to move from the initial position, shown in FIG. 2, to the release position, shown in FIG. 4, to release the locking mechanisms 22 when the seat back 26 is pivoted from the first position toward the second position, so that the locking mechanisms 22 are released before the seat back 26 reaches the second position. In the embodiment shown in FIGS. 2-4, the release bracket 42 includes the cam 52, and the release lever 40 includes an engagement member, such as a projection 54 (e.g., pin), that is engageable with the cam 52 as the seat back 26 pivots with respect to the seat bottom 24. For example, the cam 52 may extend from a central portion of the bracket body of the release bracket 42, and the projection 54 may extend from a central portion of the lever body of the release lever 40. In FIGS. 3-8, the outer perimeter of the release lever 40 is shown in phantom lines, but the projection 54 of the release lever 40 is shown in solid lines so that interaction between the cam 52 and the projection 54 is clearly visible.

Figures 5, 6:
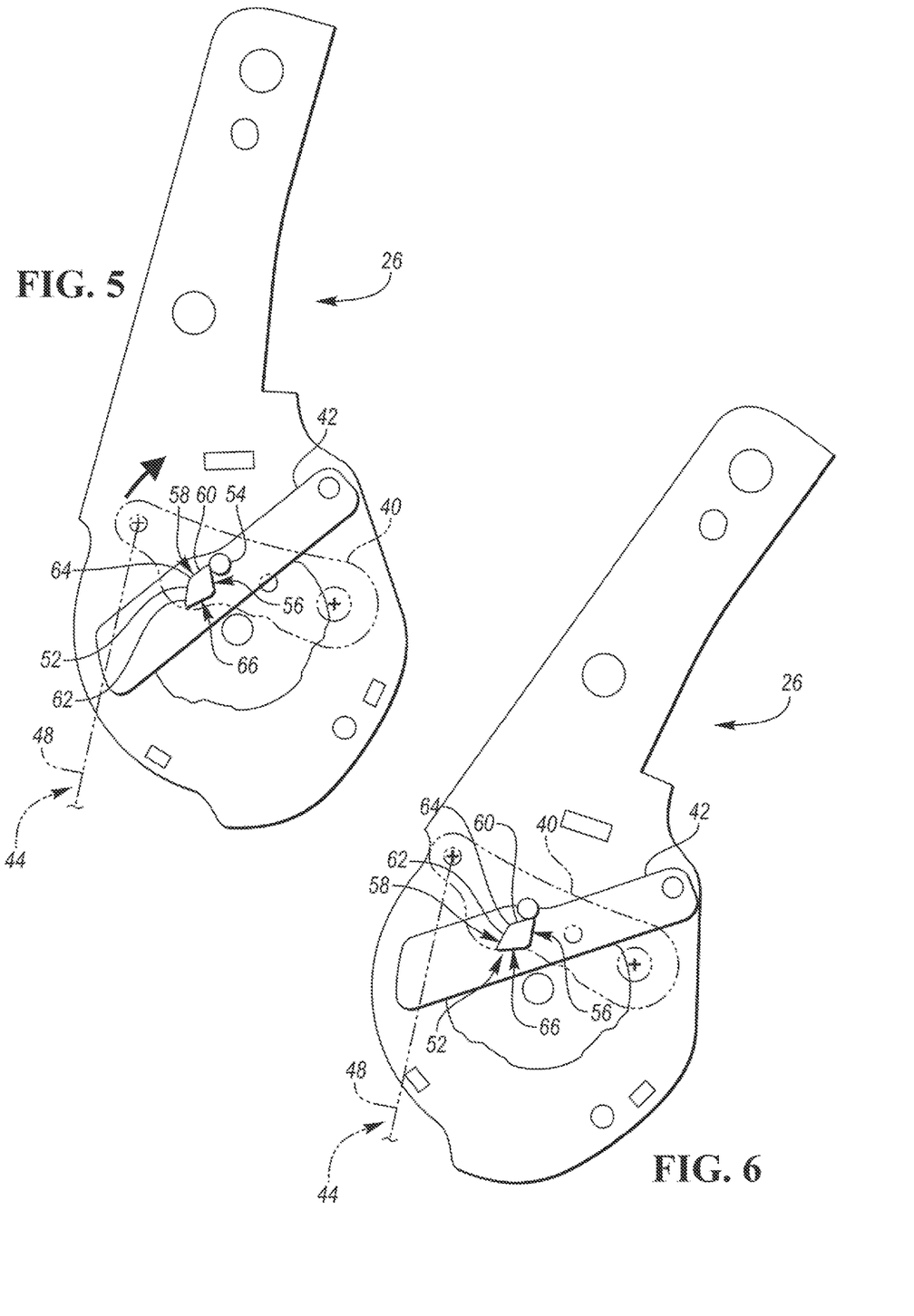
FIG. 5 is an enlarged view of a portion of the release mechanism of FIG. 4 showing the engagement member of the release lever engaged with the release surface of the cam of the release bracket.
FIG. 6 is an enlarged view of a portion of the release mechanism showing the engagement member of the release lever engaged with a dwell surface of the cam of the release bracket for maintaining the locking mechanisms in a released condition.

Referring to FIG. 5, the cam 52 includes a release surface 56 that is engageable with the projection 54 to release the locking mechanisms 22, and a dwell surface 58 that extends from the release surface 56. The dwell surface 58 is also engageable with the projection 54, and the dwell surface 58 is configured to enable each locking mechanism 22 to remain released until the seat back 26 reaches the second position, or a position proximate the second position. For example, the dwell surface 58 may be configured to enable each locking mechanism 22 to remain released until the seat back 26 is pivoted through at least 50% of the angle α from the first position to the second position. As another example, the dwell surface 58 may be configured to enable each locking mechanism 22 to remain released until the seat back 26 is pivoted through at least 75% of the angle α from the first position to the second position. As yet another example, the dwell surface 58 may be configured to enable each locking mechanism 22 to remain released until the seat back 26 is pivoted through at least 90% of the angle α from the first position to the second position.

While the cam 52 may have any suitable shape, in the embodiment shown in FIG. 5, the cam 52 has a configuration with four sides, such as a generally diamond shape. The release surface 56 forms one side of the diamond, and the dwell surface 58 includes first and second sloped sections 60 and 62, respectively, that form two other sides of the diamond and that meet at an apex 64. The cam 52 further includes a reset surface 66 that forms the fourth side of the diamond, and the reset surface 66 is configured to allow the release lever 40 to return to the initial position when the seat back 26 is pivoted from the second position back toward the first position, as explained below in greater detail.

Returning to FIG. 2, the movement mechanism 38 of the seat 10 may include a drive linkage mechanism 68 associated with the seat bottom 24 and configured to lower the seat bottom 24 when the seat back 26 is pivoted from the first position toward the second position. The drive linkage mechanism 68 may include a main link, such as a slotted drive link 70, that is pivotally mounted on the seat bottom frame 28 and engageable with a drive member, such as a drive pin 72, mounted on the seat back 26 (e.g., fixedly attached to the seat back frame 30). The drive linkage mechanism 68 may also include one or more connecting links, such as link 74, for connecting the drive link 70 to one of the rear legs 34b (e.g., left rear leg 34b). In the embodiment shown in FIG. 2, one end of the link 74 is pivotally connected to the drive link 70, and an opposite end of the link 74 is pivotally connected to the left rear leg 34b. The movement mechanism 38 may also include a similar drive linkage mechanism on the opposite side of the seat bottom 24. Additional details of the movement mechanism 38 may be found in U.S. application Ser. No. 15/192,362, which is herein incorporated in its entirety by reference.

When the seat back 26 is pivoted with respect to the seat bottom 24 from the first position shown in FIG. 2 toward the second position shown in FIG. 3, the drive pin 72 may engage the drive link 70 and cause the drive link 70 to rotate in a second direction (e.g., counterclockwise in the embodiment shown in FIG. 2). The drive link 70 in turn pulls on the link 74 which causes the left rear leg 34b to also rotate in the second direction (e.g., counterclockwise in the embodiment shown in FIG. 2). As a result, the seat bottom 24 may move from the raised, use position (shown in FIG. 2) to a lowered, stowed position or kneeled position (shown in FIG. 3).

Operation of the seat 10 will now be described in more detail. When a user desires to move the seat 10 during an easy entry operation, for example, the user may release the reclining mechanism 31 by moving a suitable release handle, which is separate from the release mechanism 36. The seat back 26 may then pivot in the first direction from the first position shown in FIG. 2 toward the second position shown in FIG. 3. The seat 10 may also include a biasing member, such as a spring (e.g., torsion spring), for urging the seat back 26 toward the seat bottom 24. Referring to FIGS. 4 and 5, as the seat back 26 pivots toward the second position, the release surface 56 of the cam 52 of the release bracket 42 engages the projection 54 of the release lever 40 and causes the release lever 40 to rotate in the first direction (e.g., clockwise in the embodiment shown in FIGS. 4 and 5). The projection 54 slides along the release surface 56 of the cam 52 as the release lever 40 rotates in the first direction until the release lever 40 reaches a release position, shown in FIG. 5, in which the cable assembly 44 has been pulled sufficiently to release the locking mechanisms 22. For example, when the release lever 40 is in the release position, the branching cables 48 may have moved sufficiently to actuate track release levers of the locking mechanisms 22, thereby unlocking or releasing the locking mechanisms 22. The seat 10 may then slide forwardly along the lower tracks 18 to a forward position shown in FIG. 3. Furthermore, the seat track assemblies 14 may include one or more biasing members, such as springs, for urging the upper tracks 20 and vehicle seat 10 forwardly with respect to the lower tracks 18.

Referring to FIG. 6, after the locking mechanisms 22 have been released, continued rotation of the seat back 26 toward the second position causes the projection 54 of the release lever 40 to move along the dwell surface 58 of the cam 52 of the release bracket 42. As mentioned above, the dwell surface 58 is configured to enable the locking mechanisms 22 to remain released until the seat back 26 reaches the second position, or a position proximate the second position. As the projection 54 moves along the dwell surface 58, continued rotation of the seat back 26 toward the second position may also cause the movement mechanism 38 to move the seat bottom 24 from the raised position shown in FIG. 4 to the lowered position shown in FIG. 3. For example, the drive pin 72 may engage the drive linkage mechanism 68 and cause the drive linkage mechanism 68 to pivot the left rear leg 34b in the second direction (e.g., counterclockwise in the embodiment shown in FIGS. 3 and 4), thereby causing the seat bottom 24 to move from the raised position to the lowered position.

Figure 7:
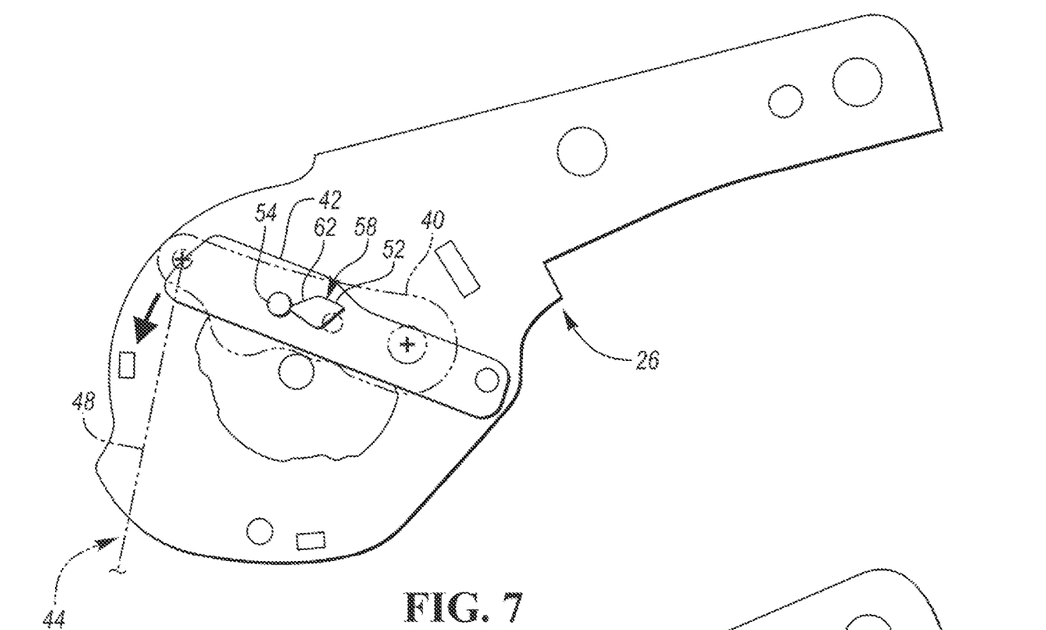
FIG. 7 is an enlarged view of the release mechanism showing the engagement member of the release lever at an end of the dwell surface of the cam of the release bracket, so that the locking mechanisms of the seat track assemblies may reengage or re-lock.

When the seat back 26 is at or proximate the second position, as shown in FIG. 7, the cam 52 may be configured to allow the release lever 40 to rotate in the second direction (e.g., counterclockwise in the embodiment shown in FIG. 7) in order to release tension on the cable assembly 44 and thereby enable the locking mechanisms 22 to reengage or re-lock (e.g., move to a locked position for locking movement of the upper track 20 with respect to the lower track 18). For example, when the seat back 26 is at or proximate the second position, the projection 54 of the release lever 40 may be at an end portion of the second section 62 of the dwell surface 58, or the projection 54 may have dropped off of or otherwise disengaged the second section 62 of the dwell surface 58, so that tension on the branching cables 48 of the cable assembly 44 may be sufficiently released, which thereby causes the locking mechanisms 22 to reengage or re-lock.

If the seat back 26 is not already at the second position, then the seat back 26 may continue to pivot in the first direction (e.g., clockwise) until the seat back 26 is at the second position shown in FIG. 3. At that time, the seat bottom 24 is also at the fully lowered or kneeled position. The user may then gain access behind the seat 10 as desired.

Figure 8:
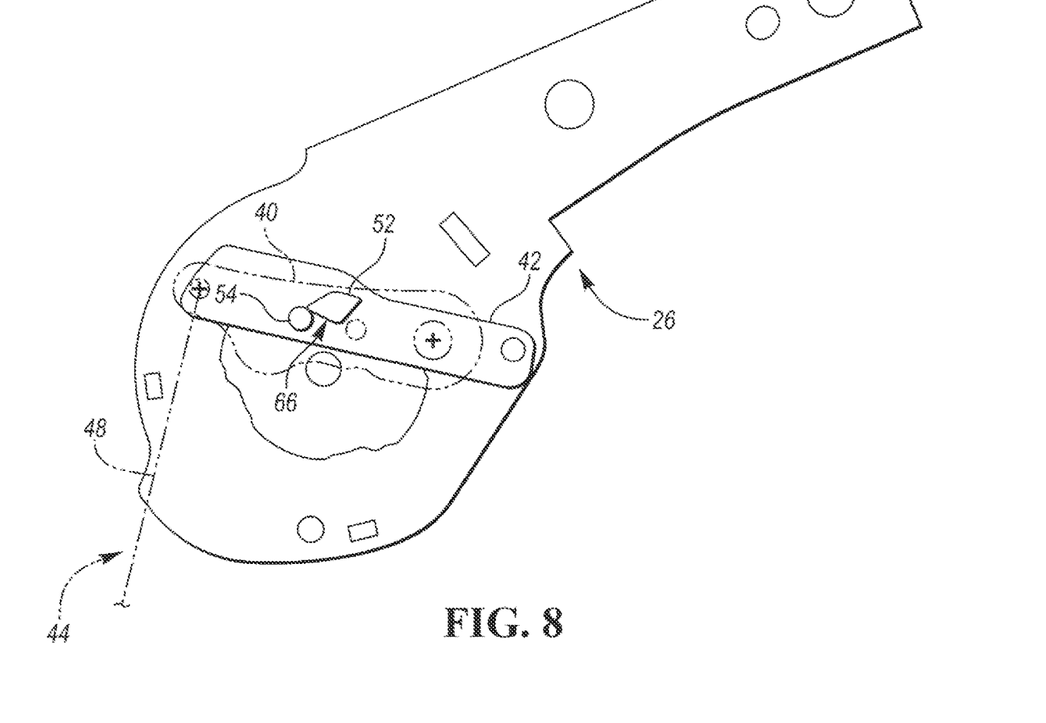
FIG. 8 is an enlarged view of the release mechanism showing the engagement member of the release lever engaged with a reset surface of the cam of the release bracket.

When the user desires to return the seat 10 to the use position, the seat back 26 may be pivoted in the second direction (e.g., counterclockwise in the embodiment shown in FIG. 3) from the second position back toward the first position. During such movement, the drive pin 72 may engage the drive linkage mechanism 68 and cause the drive linkage mechanism 68 to pivot the left rear leg 34b in the first direction (e.g., clockwise in the embodiment shown in FIG. 3), thereby causing the seat bottom 24 to move from the lowered position to the raised position shown in FIG. 1. Referring to FIG. 8, the release lever 40 may also ride along the reset surface 66 of the cam 52 until the projection 54 disengages the reset surface 66, at a right side of the reset surface 66, so that the release lever 40 may pivot in the first direction (e.g., clockwise in the embodiment shown in FIG. 8) and return to the initial position shown in FIG. 2.

The above configuration may provide numerous benefits. For example, after the locking mechanisms 22 have been released during an easy entry operation, the dwell surface 58 of the cam 52 may enable the locking mechanisms 22 to remain released during continued movement of the seat back 26 toward the second position, and without further increasing tension on the cable assembly 44. As another example, the configuration of the cam 52 may allow the release mechanism 36 to operate with reduced noise compared to prior release mechanisms. As yet another example, when the seat back 26 is moved from the second position back to the first position, the release lever 40 may return to its initial position without causing the locking mechanisms 22 to be released after being re-locked. As a result, the release mechanism 36 may be reset after performing an easy entry operation without releasing the locking mechanisms 22. Furthermore, the seat 10 may remain in the forward position shown in FIG. 3 when the release mechanism 36 is reset.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A vehicle seat for use with a vehicle having a locking mechanism, the vehicle seat comprising:
   a seat bottom mountable on the vehicle so that a position of the seat bottom may be fixed by the locking mechanism;
   a seat back pivotally attached to the seat bottom and movable between first and second positions; and
   a release mechanism configured to release the locking mechanism when the seat bottom is mounted on the vehicle and the seat back is pivoted toward the seat bottom from the first position toward the second position, the release mechanism including a release lever that is connectable to the locking mechanism, and a release bracket associated with the seat back and engageable with the release lever, wherein one of the release lever and the release bracket includes a cam configured to cooperate with the other of the release lever and the release bracket to cause the release lever to release the locking mechanism when the seat back is pivoted from the first position toward the second position, so that the locking mechanism is released before the seat back reaches the second position, wherein the cam includes a dwell surface that enables the locking mechanism to remain released until the seat back reaches the second position, or a position proximate the second position.

2. The vehicle seat of claim 1 wherein the release bracket includes the cam.

3. The vehicle seat of claim 2 wherein the release lever includes an engagement member that is engageable with the cam.

4. The vehicle seat of claim 3 wherein the cam includes a release surface that is engageable with the engagement member to release the locking mechanism, and wherein the dwell surface extends from the release surface.

5. The vehicle seat of claim 4 wherein the dwell surface includes first and second sloped sections that meet at an apex.

6. The vehicle seat of claim 5 wherein the cam is configured to allow the locking mechanism to re-lock when the engagement member reaches an end portion of the second section of the dwell surface of the cam, or when the engagement member disengages the end portion of the second section of the dwell surface of the cam.

7. The vehicle seat of claim 1 wherein the cam is generally diamond-shaped.

8. The vehicle seat of claim 1 wherein the release lever is movable in a first direction when the seat back is initially pivoted from the first position toward the second position, and wherein the release lever is movable in a second direction prior to the seat back reaching the second position.

9. The vehicle seat of claim 8 wherein the first direction is in an upward pivot direction, and the second direction is a downward pivot direction.

10. The vehicle seat of claim 8 wherein the release lever is movable in the second direction when the seat back is initially pivoted from the second position back toward the first position, and wherein the release lever is movable in the first direction prior to the seat back reaching the first position.

11. The vehicle seat of claim 8 wherein the release lever is biased in the first direction.

12. The vehicle seat of claim 1 wherein the vehicle includes a seat track assembly having the locking mechanism, and the seat bottom is mountable on the seat track assembly so that the seat bottom is translatable with respect to the vehicle.

13. The vehicle seat of claim 12 further comprising a pivotable leg attached to the seat bottom for mounting the seat bottom on the seat track assembly, and a movement mechanism attached to the seat bottom, wherein the movement mechanism is configured to lower the seat bottom by causing the leg to pivot with respect to the seat bottom when the seat bottom is mounted on the seat track assembly and the seat back is pivoted from the first position toward the second position.

14. The vehicle seat of claim 1 wherein the cam is configured to allow the release lever to return to an initial position, when the seat back is pivoted from the second position back toward the first position, without releasing the locking mechanism.

15. A vehicle seat for use with a vehicle having a seat track assembly including a first track, a second track that is movable with respect to the first track, and a locking mechanism for locking the second track with respect to the first track, the vehicle seat comprising:
   a seat bottom mountable on the second track of the seat track assembly;
   a seat back pivotally attached to the seat bottom and movable between first and second positions; and
   a release mechanism configured to release the locking mechanism of the seat track assembly when the seat bottom is mounted on the second track of the seat track assembly and the seat back is pivoted toward the seat bottom from the first position toward the second position, the release mechanism including a release lever that is connectable to the locking mechanism of the seat track assembly, and a release bracket connected to the seat back and engageable with the release lever, wherein one of the release lever and the release bracket includes a cam configured to cooperate with the other of the release lever and the release bracket to cause the release lever to release the locking mechanism of the seat track assembly when the seat back is pivoted from the first position toward the second position, so that the locking mechanism is released before the seat back reaches the second position, wherein the cam includes a dwell surface that enables the locking mechanism to remain released until the seat back reaches the second position, or a position proximate the second position.

16. The vehicle seat of claim 15 wherein the release bracket includes a bracket body, and the cam extends from the bracket body.

17. The vehicle seat of claim 16 wherein the release lever includes a lever body and a projection that extends from the lever body, and wherein the projection is engageable with the cam.

18. The vehicle seat of claim 16 wherein, when the seat bottom is mounted on the second track of the seat track assembly and the release lever is connected to the locking mechanism, the cam is configured to enable the locking mechanism to reengage to lock the second track with respect to the first track when the seat back has moved to the second position or the position proximate the second position, and the cam is further configured to allow the release lever to return to an initial position, when the seat back is pivoted from the second position back toward the first position, without releasing the locking mechanism.

19. The vehicle seat of claim 16 wherein the cam has a diamond shape.

20. The vehicle seat of claim 15 wherein, when the seat bottom is mounted on the second track of the seat track assembly and the release lever is connected to the locking mechanism, and when the seat back is pivoted from the first position toward the second position to release the locking mechanism, the dwell surface is configured to enable the locking mechanism to remain released until the seat back is pivoted through at least 75% of an angle from the first position to the second position.

* * * * *